United States Patent
Zhang et al.

(10) Patent No.: US 12,209,978 B2
(45) Date of Patent: Jan. 28, 2025

(54) LABORATORY-BASED 3D SCANNING X-RAY LAUE MICRO-DIFFRACTION SYSTEM AND METHOD (Lab3DµXRD)

(71) Applicant: Danmarks Tekniske Universitet, Kongens Lyngby (DK)

(72) Inventors: Yubin Zhang, Kongens Lyngby (DK); Dorte Juul Jensen, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 232 days.

(21) Appl. No.: 18/004,727

(22) PCT Filed: Jul. 12, 2021

(86) PCT No.: PCT/EP2021/069272
§ 371 (c)(1),
(2) Date: Jan. 9, 2023

(87) PCT Pub. No.: WO2022/013127
PCT Pub. Date: Jan. 20, 2022

(65) Prior Publication Data
US 2023/0251213 A1      Aug. 10, 2023

(30) Foreign Application Priority Data

Jul. 15, 2020  (EP) .................................. 20186035

(51) Int. Cl.
*G01N 23/00* (2006.01)
*G01N 23/20025* (2018.01)
(Continued)

(52) U.S. Cl.
CPC ..... *G01N 23/20025* (2013.01); *G01N 23/207* (2013.01); *G06T 17/00* (2013.01);
(Continued)

(58) Field of Classification Search
CPC ... G01N 2223/1016; G01N 2223/3307; G01N 23/20025; G01N 23/207; G06T 17/00
See application file for complete search history.

(56) References Cited

U.S. PATENT DOCUMENTS

| 8,130,908 B2 | 3/2012 | Huang et al. |
| 2006/0098781 A1 | 5/2006 | Bloom et al. |

(Continued)

FOREIGN PATENT DOCUMENTS

| WO | WO 2009/126868 A1 | 10/2009 |
| WO | WO 2014/063002 A1 | 4/2014 |
| WO | WO 2018/175570 A1 | 9/2018 |

OTHER PUBLICATIONS

Chen, Xian et al., "Quantitative Microstructural Imaging by Scanning Laue X-Ray Micro- and Nanodiffraction" MRS Bulletin, 2016, pp. 445-453, vol. 41, No. 6.

(Continued)

*Primary Examiner* — Dani Fox
(74) *Attorney, Agent, or Firm* — Knobbe Martens Olson & Bear LLP (57) ABSTRACT

A laboratory-based 3D scanning X-ray scanning Laue micro-diffraction system and method for characterisation of crystalline materials, comprising: a focusing optic, a sample located at a distance from the focusing optic, a laboratory X-ray source, a stage to translate and rotate the sample, a detector arranged to detect the Laue diffraction patterns of the diffracted X-rays. The method comprising scanning each layer of the sample by translating the sample relatively to the focused beam at different rotations to illuminate each voxel in the layer in more than one rotation and indexing each voxel within the layer using the recorded Laue diffraction patterns at different rotations. By repeating the translation (Continued)

and rotation for different layers of the sample, a 3D image of the grain structure of the sample is reconstructed.

15 Claims, 5 Drawing Sheets

(51) Int. Cl.
  *G01N 23/207* (2018.01)
  *G06T 17/00* (2006.01)
(52) U.S. Cl.
  CPC ............ *G01N 2223/1016* (2013.01); *G01N 2223/3307* (2013.01)

(56) References Cited

U.S. PATENT DOCUMENTS

2012/0008736 A1  1/2012  Lauridsen et al.
2015/0316493 A1* 11/2015  Feser ............... G01N 23/207
                                                378/21

OTHER PUBLICATIONS

Lynch, P.A. et al., "A laboratory based system for Laue micro x-ray diffraction" Review of Scientific Iinstruments, Mar. 2007.
Poulsen, Henning Friis et al., "4D Characterization of Metals by 3DXRD" Risoe International Symposium on Materials Science. Proceedings, 2010, pp. 101-119, vol. 31.
European Search Report for EP 20186035 issued Feb. 26, 2021.
International Search Report for PCT/EP2021/069272 dated Oct. 7, 2021.

* cited by examiner

LABORATORY-BASED 3D SCANNING X-RAY LAUE MICRO-DIFFRACTION SYSTEM AND METHOD (Lab3DµXRD)

CROSS REFERENCE TO RELATED APPLICATIONS

This application is a U.S. National Phase Application of PCT International Application Number PCT/EP2021/069272, filed on Jul. 12, 2021, designating the United States of America and published in the English language, which is an International Application of and claims the benefit of priority to European Patent Application No. 20186035.0, filed on Jul. 15, 2020. The disclosures of the above-referenced applications are hereby expressly incorporated by reference in their entireties.

FIELD OF THE INVENTION

The present invention relates to the general field of characterisation of crystalline materials using diffraction measurements.

BACKGROUND OF THE INVENTION

The characterisation of crystalline materials can help scientists both in industry and academia to understand the properties of crystalline materials and the relation between processing/manufacturing and properties/performance. This is done by characterising the crystallographic orientations of each crystal (also referred to as grain) in polycrystalline materials by the use of diffraction measurements, wherein a beam is diffracted from individual grains and the diffraction patterns are recorded. In order to fully characterise the sample, imaging of the 3D distribution of grain orientations are needed.

The first form of 3D X-ray diffraction, 3DXRD, was invented 20 years ago where a monochromatic hard X-ray beam originating from a high-flux synchrotron source penetrates the samples with a depth penetration of several centimetres in the case of aluminium or millimetres in the case of steel. In 3DXRD experiments, a tomographic data acquisition routine is applied using either a layer or box beam which illuminates a section or a volume of the sample, respectively. High energy X-ray diffraction microscopy and diffraction contrast tomography (DCT), are branches of 3DXRD, which can characterise grains larger than a few pm, with a spatial resolution down to about 300 nm, with a standard resolution of about 1 µm. Currently, with 3DXRD it is still challenging to characterise deformed materials and to provide local intragranular strain information.

Scanning 3DXRD can be used to increase the spatial resolution and to characterise local strain information, using a focused monochromatic beam wherein the sample volume is mapped after a series of translation and rotation steps. In all of these cases, when monochromatic X-rays are used, the resulting diffraction is Bragg diffraction.

Another form of synchrotron 3D characterisation is Laue micro-diffraction techniques, wherein polychromatic X-rays are focused by non-dispersive Kirkpatrick-Baez mirrors to a size of ~0.5 µm and directed onto the sample. A Pt wire or a knife edge is used as a differential aperture to resolve where along the beam within the sample, the Laue diffraction occurs. 3D volume mapping is achieved after the sample is translated horizontally and vertically. No rotation of the sample is needed in the case of the Laue micro-diffraction technique.

One limitation with these techniques are that they require synchrotron facilities, which are expensive to build and operate with limited beam time available. In order to enable characterisation of more materials quicker and cheaper, it is crucial that these systems and techniques are adapted to work with X-rays from a laboratory source. So far only one such system has been developed, namely a LabDCT system. The LabDCT system is disclosed in U.S. Pat. Nos. 8,385,503B2 and 9,383,324B2.

U.S. Pat. Nos. 8,385,503B2 and 9,383,324B2 or US 2015/0316493 A1 discloses a system wherein white/polychromatic divergent light stemming from a laboratory X-ray source is led through an aperture and onto the sample. In this system, a sample translation is performed for alignment of the sample. The X-ray beam that is directed to the sample is divergent such that a certain volume of the sample is illuminated. The sample is only rotated during LabDCT data acquisition, such that LabDCT works by using an aperture confining a polychromatic conical X-ray beam to the desired volume. When the sample is rotated, multiple diffraction spots from different crystallographic lattice planes of the same grain can be recorded with high signal-to-noise ratio on an area detector. The spots are used for the indexing of crystallographic orientations and for reconstructing the 3D sample volume. However, measurement of stress is currently not possible.

While LabDCT works using a laboratory X-ray source it has inherent constrains due to the Laue focusing effect, which requires that the crystals/grains are defect free. It can further only map grains in 3D with a spatial resolution of 5-10 µm and only for grains larger than 20-30 µm. As the typical grain size for most metals is in the range of 1-25 µm, this is not sufficient. Further, LabDCT cannot characterise deformed materials nor determine local lattice strain within individual grains.

WO 2009/126868 A1 discloses an x-ray generating system using focused monochromatic X-rays, or X-rays with a limited range of discretized energies, but not a continuous polychromatic spectrum, which are, as stated in U.S. Pat. No. 9,383,324B2, considered to be too low for DCT, DCT is originally designed based on a monochromatic synchrotron X-ray beam.

Hence, an improved laboratory-based diffraction system and method would be advantageous, and in particular a system and method that can characterise small grains with sizes of the order of a few µm and that can determine local lattice strain, plus can work even if the sample is deformed.

The project leading to this application has received funding from the European Research Council (ERC) under the European Union's Horizon 2020 research and innovation programme (grant agreement No 788567).

OBJECT OF THE INVENTION

It is a further object of the present invention to provide an alternative to the prior art.

In particular, it may be seen as an object of the present invention to provide a laboratory-based 3D scanning X-ray Laue micro-diffraction system that solves the above mentioned problems of the prior art of characterising small grains with sizes of the order of a few µm, determining local lattice strain and enabling the characterisation of deformed samples.

SUMMARY OF THE INVENTION

Thus, the above described object and several other objects are intended to be obtained in a first aspect of the invention by providing a laboratory-based 3D scanning X-ray Laue micro-diffraction system for the characterisation of crystalline materials, which may comprise:
- a focusing optic,
- a sample to be characterised during use of the system, which may be located at a distance from the focusing optic,
- a laboratory X-ray source which may generate a polychromatic X-ray beam,
- the focusing optic may be arranged in the path of the beam between the X-ray source and the sample to create a focused beam with a spot size diameter of less than 30 μm at an image point inside the sample, the focused beam may be diffracted from an interior sample volume illuminated by the beam within the sample creating diffracted X-rays,
- a stage for holding the sample, the stage may be adapted to rotate and translate the sample in relation to the focused beam at specific intervals and angles to change the interior sample volume position within the sample,
- a detector which may be arranged to detect the Laue diffraction patterns of the diffracted X-rays.

In some embodiments, the detector is a 2D detector.

In a second aspect the invention further relates to a method for generating 3D orientation imaging of crystalline materials, which may comprise
- focusing a polychromatic X-ray beam generated by a laboratory X-ray source to a spot size diameter less than 30 μm inside a sample, to create a focused beam,
- defining a first translation axis which may be perpendicular to the beam,
- defining a second translation axis which may be perpendicular to the first translation axis and to the beam,
- defining one or more layers in a predetermined gauge volume of the sample along the second translation axis,
- scanning each layer of the sample by
  - translating the sample along the first translation axis recording the resulting Laue diffraction patterns for each translation,
  - wherein each layer of the sample may be scanned at different rotations of the sample, which may illuminate each voxel of the layer in more than one rotation, such that Laue diffraction patterns from each voxel are recorded in at least two recordings,
- wherein the layers are scanned by translating the sample to the next layer along the second translation axis,
- indexing the Laue diffraction patterns using the recorded Laue diffraction patterns to reconstruct a 3D image, preferably by indexing each voxel within the gauge volume, of the grain structure of the sample.

The inventors have realised that by combining the techniques of scanning 3DXRD and Laue microdiffraction, one may in a laboratory system be able to characterise smaller grain sizes and local lattice strains. The invention have taken from scanning 3DXRD the data acquisition routine by both translating and rotating the sample using a stage and from Laue micro-diffraction the concept of using a polychromatic X-ray source and focusing the beam to smaller spot sizes, measuring the Laue-diffraction patterns of the polychromatic beam. When scanning the sample by translation at different rotations of the sample, individual voxels within the sample may be illuminated and detected in multiple recordings, and the crystallographic orientation within each voxel may be determined based on these recordings. By repeating the scanning and rotation for each layer of the sample, a 3D image of the sample may be reconstructed.

In order for the technique to be adapted to a laboratory setting using a laboratory X-ray source, a focusing optic may need to be used in order to focus the X-ray source to a spot size of less than 30 μm.

By focusing the X-ray source to spot diameter sizes of less than 30 μm, may enable grains in the range 1-30 μm to be characterised and the use of polychromatic X-rays may allow for the use of Laue diffraction techniques such that local orientations and lattice strains may be measured and a 3D volume reconstructed. The lower and higher limit of the grain sizes may depend on the specifications of the focusing optic and the sample to be measured.

When using the polychromatic X-ray beam it may be possible to measure local lattice strain within a grain in the sample since such lattice strains are possible to reconstruct using Laue diffraction patterns. However, since a laboratory based X-ray source may not generate the required flux for using a differential aperture (which is used for synchrotron Laue microdiffraction) it is necessary to combine the technique with the scanning 3DXRD technique in order to resolve orientation and strain information locally within the individual grains in the sample.

Combining these techniques have not yet been envisioned, as it may be apparent that the current invention has not even been envisioned with synchrotron micro-diffraction, due to the complexity of switching from Bragg diffraction to Laue diffraction.

Traditional as well as non-traditional indexing methods may be used in the method, as to index the Laue diffraction patterns. The latter may be using machine trained methods or deep learning.

The current invention therefore combines the techniques of two synchrotron methods in a novel and inventive way to create a laboratory-based 3D scanning Laue micro-diffraction system and method (Lab3DμXRD).

In U.S. Pat. No. 9,383,324B2, the sample translation is only for alignment prior to data acquisition, not for data acquisition. The focusing system in WO 2009/126868 A1 produces only monochromatic X-rays, or X-rays with a limited range of discretized energies but not a continuous polychromatic spectrum, which are, as said in U.S. Pat. No. 9,383,324B2, considered to be too low for DCT. DCT is originally designed based on a monochromatic synchrotron X-ray beam.

The focusing system described in WO 2009/126868 A1 is mainly to focus a monochromatic beam and typically soft X-rays (energy below 10 keV), while the system according to the present invention is achieving a focusing optics that produces focused hard polychromatic X-rays (energy >10 keV) with a continuous energy spectrum, which is particularly challenging, especially to have a smallspot size of <20-30 μm.

In preferred embodiments, the system may comprise a shield which may be arranged in between source and sample, and a beamstop which may be arranged after the sample. This may be advantageous to have a beamstop after the sample for blocking the transmitted beam, thereby protecting the detector, if the detector is placed in the path of the transmitted beam. Having a shield may be advantageous since it will block the direct beam from the source that has not passed through the focusing optic and thereby improve the contrast of the diffraction patterns.

In preferred embodiments the laboratory X-ray source may produce a polychromatic beam with X-ray energies ranging from 5-150 keV.

In preferred embodiments, the focusing optic may focus the X-ray beam to a spot size diameter less than 20 μm, preferably less than 10 µm, more preferably less than 5 µm or most preferably less than 1 µm.

It may be advantageous to have a spot size diameter as small as the smallest grain that is to be measured in the crystalline material.

In preferred embodiments, the detector may be of the type: photon counting, flat-panel, scintillator based CCD or CMOS detector.

In preferred embodiments, the focusing optic may be a twin paraboloidal X-ray mirror optic, ellipsoidal optic, polycapillary optic, Kirkpatrick-Baez mirrors etc.

By using different focusing optic, the spot diameter size of the focused beam may be chosen according to the specification and requirements of the sample and 3D characterisation.

In preferred embodiments, two or more detectors may be arranged at different locations in the path of the diffracted X-rays, the detectors may have non overlapping regions in a radial plane defined by the diffracted X-rays.

In preferred embodiments, the detector(s) may be placed 5-10 mm to a meter from the sample and the focusing optic may be placed 20-50 mm from the sample (which may be measured from the end of the optic to the sample).

In preferred embodiments, the translation steps along the first translation axis may be chosen based on the size of the beam and the grain size of the sample. The translation intervals may be of the range of the beam spot size, 1-30 µm or bigger.

In preferred embodiments, the translation range may cover part of or the whole of the longest side of the sample at the different rotations. In other embodiments, the rotation and translation intervals and steps may be chosen based on the gauge volume that is to be characterised within the sample. In preferred embodiments, the translation intervals and range along the first translation axis may be the same for different rotations of the sample. It however may in other embodiment be different translation ranges and intervals for different rotations.

In such a situation the defined voxels may not be uniformly distributed. This could be advantageous in situations, wherein for example a hole in the sample is present, such that the hole can be skipped in the translation. In another embodiment, the translation step may be the same at one rotation angle, but different at different rotation angles. For example the translation step at 0 degrees may be 1 unit, and the translation step at 45 degrees may be sqrt(2)/2 unit, etc. Alternatively the translation steps may be characterised at each rotation beforehand, so as to skip translation step where the beam is not directed into the sample.

In preferred embodiments, the spatial resolution may be improved by translating the sample with a step size smaller than the focussed beam spot diameter size.

In preferred embodiment, the rotations may add up to a quarter, half or full revolution, but other rotation ranges is envisioned. In preferred embodiments the rotation intervals may be of the order of 1 to 90 degrees and the same for different rotations. In such embodiments the sample may be rotated a number of time, such as 7 rotations at intervals of 0 degrees, 30 degrees, 60 degrees, 90 degrees, 120 degrees, 150 degrees and 180 degrees, such that each layer is scanned 7 times. In some embodiments, the rotation intervals may change for each rotation, such as a first rotation of 30 degree, then 60 degree etc.

However, the translation and rotation may be any range and interval combination depending on the sample to be characterised. This may ensure that individual voxels within the sample can be recorded by more than one recordings. It may be used to select measurements for recording selected voxel in separate measurements.

In preferred embodiments, the Laue diffraction patterns are detected at different time intervals to create a 4-D image, where time is the fourth dimension, when the crystalline material may be exposed to any external stimuli.

In preferred embodiments, the indexing is of the type: patterns matching, dictionary index, deep learning.

By gauge volume is preferably meant the volume within the sample that is to be characterised.

By interior sample volume is preferably meant the volume within the sample that is illuminated by the beam during a measurement.

By voxel is preferably meant a defined volume within the sample. The voxel shape may be different from a cubic element. Voxels may be overlapping.

By scanning is preferably meant translating the sample relative to the beam taking new measurements along the scanning direction.

By range is preferably meant the distance/rotation angle between the first translation/rotation and the last translation/rotation. By step is preferable meant the change in distance/rotation.

By layer is preferably meant a virtually sliced segment of the sample.

By spot size diameter is preferably meant the cross-sectional diameter of the smallest size in the beam.

By laboratory X-ray source is preferably meant a machine and source to be used in a laboratory setting and is negatively defined as not being a synchrotron beam.

By indexing is preferably meant to identify the diffraction spots in the diffraction images and to determine from which lattice planes of a grain (or voxel) they are diffracted, and thereby determine the crystallographic orientation of the grain (or voxel).

By recording is preferably meant the detection and storing of diffraction patterns form the detector for one measurement.

By measurement is preferably meant a beam exposure to the sample at a certain time, during which diffraction patterns are recorded.

BRIEF DESCRIPTION OF THE FIGURES

The diffraction system and method according to the invention will now be described in more detail with regard to the accompanying figures. The figures show one way of implementing the present invention and is not to be construed as being limiting to other possible embodiments falling within the scope of the attached claim set.

FIG. 1 a) illustrates an embodiment of the set-up of the invention, FIG. 1 b) illustrates an embodiment of the interior sample volume illuminated by the focused beam and FIG. 1 c) illustrates an embodiment of the method according to the invention.

DETAILED DESCRIPTION OF AN EMBODIMENT

Figure 1:
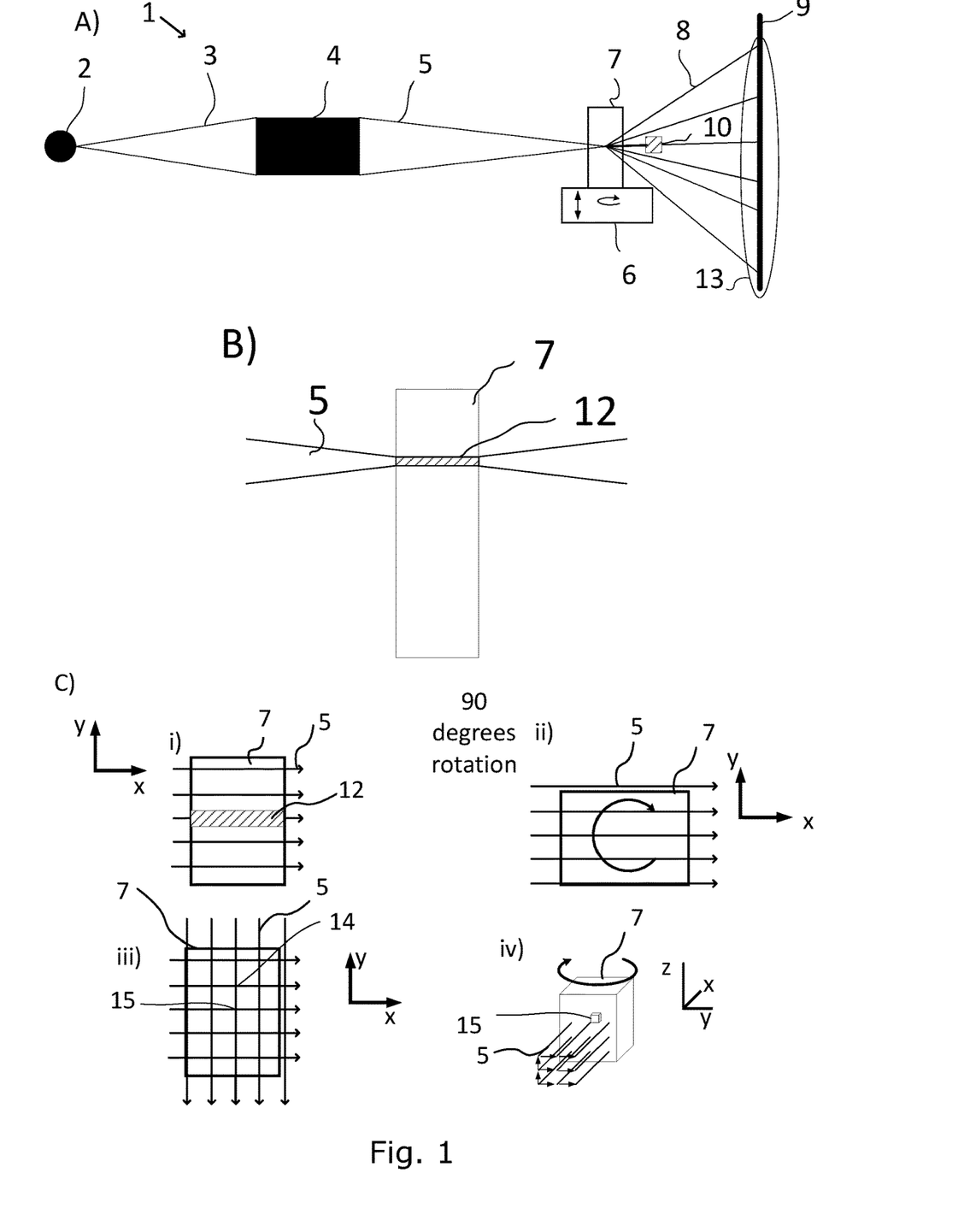

FIG. 1 a) shows an embodiment of a laboratory-based 3D scanning X-ray Laue micro-diffraction system 1 for the characterisation of crystalline materials. The system comprises a sample 7 to be characterised, which is located at a distance from a focusing optic 4, a laboratory X-ray source 2 for generating a polychromatic X-ray beam 3 that is directed into the focusing optic 4, such that the focusing optic 4 is arranged in the path of the beam 3 between the X-ray source 2 and the sample 7 creating a focused beam with a spot size diameter of less than 30 µm at an imaging point located inside the sample. The sample 7 is preferable a crystalline material.

The focused beam 5 will illuminate an interior sample volume 12 within the sample 7 creating diffracted X-rays 8 from the entire illuminated interior sample volume 12. The interior sample volume 12 can be seen in FIG. 1 *b*). In FIG. 1 *b*) the shape of the focused beam 5 will be cylindrical within the sample 7 due to the focal length, which in some embodiments will be the same as or bigger than the thickness of the sample 7, but the shape of the illuminated interior sample volume 12 is dependent on the focused beam 5, that is illuminating the sample 7 and the relative location of the focal point and size of the focal length within the sample. In some embodiments, the sample thickness can be greater than the focal length, such the beam will diverge or converge within the sample, such that the interior sample volume 12 is not of cylindrical shape.

The diffracted X-rays 8 are detected and recorded by a detector 9, which is placed in the path of the diffracted X-rays 8 in order to detect the Laue diffraction patterns 13 of the interior sample volume 12. The detector could in an embodiment be placed in transmission or reflection geometry.

The detector 9 could in an embodiment be of the type: photon counting, flat-panel, scintillator based CDD or CMOS detector, etc.

The system further includes a stage 6, adapted to support, rotate and translate the sample 7 relative to the focused beam 5. The translation of the sample 7 by the stage 6 can in an embodiment occur in two directions that are perpendicular to each other. The stage 6 can in some embodiments be comprised of multiple components, such as a holder for holding the sample and a goniometer device for translating and rotating the holder.

The stage 6 is adapted to rotate and translate the sample 7 at specific intervals and angles such that the sample 7 can be scanned in a grid like manner at different rotations of the sample 7, as seen in FIG. 1 *c*).

The sample 7 can, in an embodiment, be translated along a first translation axis that is perpendicular to the beam and a second translation axis that is perpendicular to the first translation axis and the beam. The desired gauge volume of the sample 7 is divided into layers along the second translation axis.

The method thereby consists of scanning the sample 7 layer by layer in the first translation axis that is perpendicular to the beam. In FIG. 1 *c*) i) a top view of the sample 7 along the second translation axis, is shown, wherein the sample 7 is scanned by translating the sample in 5 steps along the y-axis, the y-axis in FIG. 1 *c*) corresponds to the first translation axis, the z-axis to the second translation axis and the beam is propagating along the x-axis.

Each of these translation steps corresponds to separate measurements and recordings of the Laue diffraction patterns 13 created by the different interior sample volumes 12 being illuminated. In FIG. 1 *c*) i) most of the X-ray beams are shown as lines, but the beam will have a finite size as shown for one beam in FIG. 1*c* i) such that an interior sample volume within the sample is illuminated.

After the sample 7 has been scanned along the y-axis, the sample 7 is rotated with a specific rotation interval and scanned again along the y-axis, as seen in FIG. 1 *c*) ii), where the sample 7 is rotated 90 degrees and the sample 7 is scanned again along the y-axis, such that each rotation is followed by scanning along the y-axis.

The rotation and translation steps depends on the sample. Each translation in the scanning step is a separate measurement, such that in the example shown in FIG. 1 *c*) iii), 5*2=10 measurements are carried out for one layer of the sample 7.

In some embodiments, the data gathering procedure is to direct the beam to the beginning of the translation range in a layer of the sample 7, record the Laue diffraction pattern 13, translate the sample 7 with a translation step along the translation range, record the new Laue diffraction pattern 13. When the translations have covered the entire translation range, the sample 7 is rotated and the translation steps are repeated. In this embodiment the rotation axis is the z-axis, but in some embodiments the rotation axis could be independent from the first translation and second translation axes.

When a full revolution or the desired rotation range have been achieved the sample 7 is translated along the second translation axis, in FIG. 1 *c*) this is the z-axis, to scan the next layer. In some embodiments the axes do not need to be perpendicular to each other.

Figure 5:
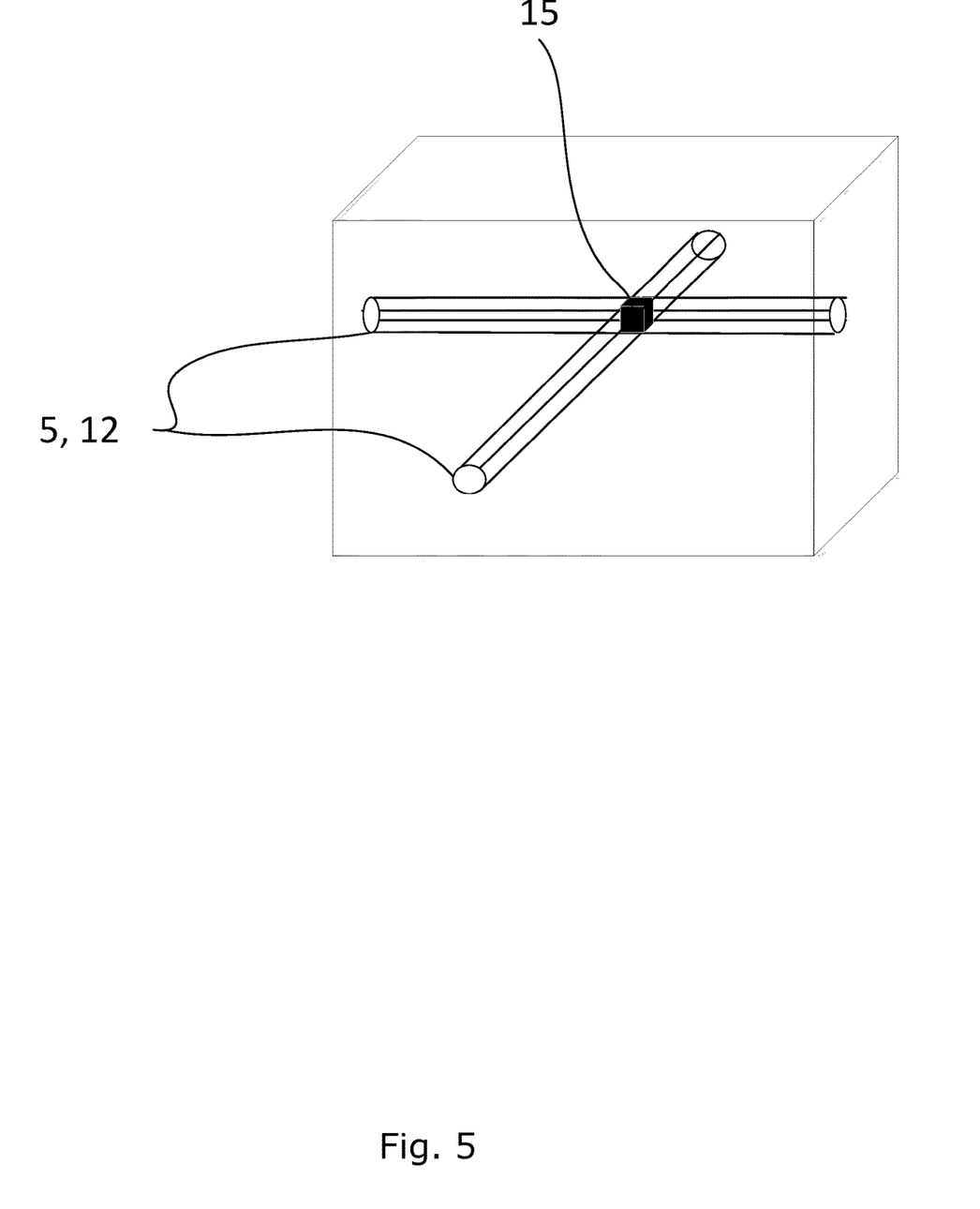

By scanning the sample 7 at different rotations, each voxel 15 of the sample 7 can be illuminated during at least two measurements. A voxel 15 is a defined volume within the sample 7, as seen in FIG. 1) *c*) iii) and iv) and FIG. 5.

By having two or more recordings of diffraction patterns 13 from the same voxel 15, the voxel 15 can be reconstructed by indexing the Laue-diffraction patterns 13. Each voxel 15 in the sample can be separately indexed and a 3D image of the sample 7 sequentially reconstructed. By having smaller translation and rotation steps, each voxel 15 will be illuminated in more measurements and the resolution will improve.

It is apparent that the rotation and translation range and step size is chosen to ensure that each voxel 15 is recorded in at least two recordings, but the size of the voxel 15 can equally be chosen based upon a fixed translation and rotation step and/or the beam size. The voxels 15 can in some embodiments be of different sizes within the sample, which would occur if the translations or rotations step is non-linear, and may be overlapping. In some embodiments the translation and rotations steps are chosen to only characterise certain voxels within the gauge volume.

This means that in order to extract information about the crystallographic orientation of each defined voxel, signals from the shared interior volume from different measurement are indexed. These shared volumes (i.e. voxels) can a priori be determined based on the translations and rotations, such as the voxel 15 in FIG. 1 *c*) iii), which is defined by translation measurement 3 of the 0 degree rotation and measurement 3 of the 90 degree rotation.

Voxel 14 is reconstructed using the second measurement (from the top) of the 0 degree rotation and the third measurement of the 90 degree rotation. The recordings of the measurements used for the reconstruction of a specific voxel can therefore be chosen in the same manner a priori before measuring. If only voxels 14 and 15 are to be characterised, only 3 measurements would be needed. The measurement procedure can therefore be chosen a priori based on the desired gauge volume and the voxels within the gauge volume.

The translation steps and ranges, and the rotations are therefore chosen based on the voxels in the gauge volume, ensuring that each voxel is wholly or partly illuminated during at least two measurements. The measurements may contain metadata on the translation and rotation step in order to choose the correct measurements to reconstruct a voxel. In FIG. 1 c) the measurement could contain metadata on scan position, rotation position, and layer position. These data could also include (first translation axis coordinate, second translation axis coordinate, rotation) data of the sample 7, where the data could be provided by the stage, such as by a positioning component within the stage 6.

The method can be seen as a grid being projected onto the surface of the sample 7. The sample is then rotated, while keeping the grid point spatially fixed, such that the same grid point is projected onto the newly rotated sample 7 with the same spatially coordinate. The specific rotation, translation step size and layer size are chosen based upon the shape and thickness of the sample and the beam, as well as other measurement factors.

For example with a rotation step of 90 degrees and rotation range of 360 degrees and 5 translations along the y-axis and 3 layers scanned as shown in FIG. 1 c), the number of measurements would be 4*5*3=60, with at least 5*5*3=75 individual voxels being able to be characterised within the sample 7. Some of the measurements might be null measurements.

The interior sample volumes 12 illuminated by the focused beam 5 can in some embodiments, be overlapping and in other embodiment be non-overlapping. The number and overlap of these interior sample volumes may determine the resolution of the resulting 3D image.

Having such a system, will in an embodiment enable characterisation of grains with size >~1 μm. The specific grain size that can be characterised may depend on the specification of the focusing optic 4 and the chosen overlap between the interior sample volumes 12. The focusing optic 4 will focus the X-ray beam to the required size, as well as increasing the flux. The system therefore combines the idea of synchrotron scanning 3DXRD with synchrotron Laue micro-diffraction in a laboratory setting.

In a preferred embodiment, the laboratory X-ray source 2 produces a polychromatic beam 3 with X-ray energy ranging from 5-150 keV. These energies can normally be produced by an X-ray tube utilizing a metallic target, rotating anode, liquid metal anode or a linear accelerated source, etc. In some embodiments the source 2 could also be a synchrotron source with corresponding higher fluxes. The system and method as disclosed works equally well for laboratory settings as well as synchrotron settings.

In an embodiment the focusing optic 4 focuses the X-ray beam to a spot size diameter of less than 20 μm, preferably 10 μm, more preferably 5 μm, most preferably 1 μm. Focusing the beam will at the same time enhance the intensity of the focused beam 5.

The choice of focusing optic 4 will depend on the grains that is to be characterised, for example when characterising 1-5 μm grains the focusing optic 4 is best chosen to focus the beam 3 to spot size diameters of less than 5 μm. The focusing optic 4 could in an embodiment focus the beam 3 to spot diameter size of less than 1 μm, such that 1 μm grains can be studied in an optimal way.

In some embodiment, the focusing optic 4 is a twin paraboloidal X-ray mirror lens, ellipsoidal optic, polycapillary optic and Kirkpatrick-Baez mirrors, etc. By using a twin paraboloidal X-ray mirror it may be possible to focus the beam 4 to spot size diameter of 5 μm or even smaller.

The detector 9 can be placed with an angle to the incoming beam as long as the diffracted beams stemming from the interior sample volume 12 can be measured. In such an embodiment a beam stop 10 is not required, as the detector is not placed in the path of the transmitted beam 11. If the detector 9 is placed in the path of the transmitted beam 11 then a beam stop 10 may be placed to block this transmitted beam.

Figure 2:
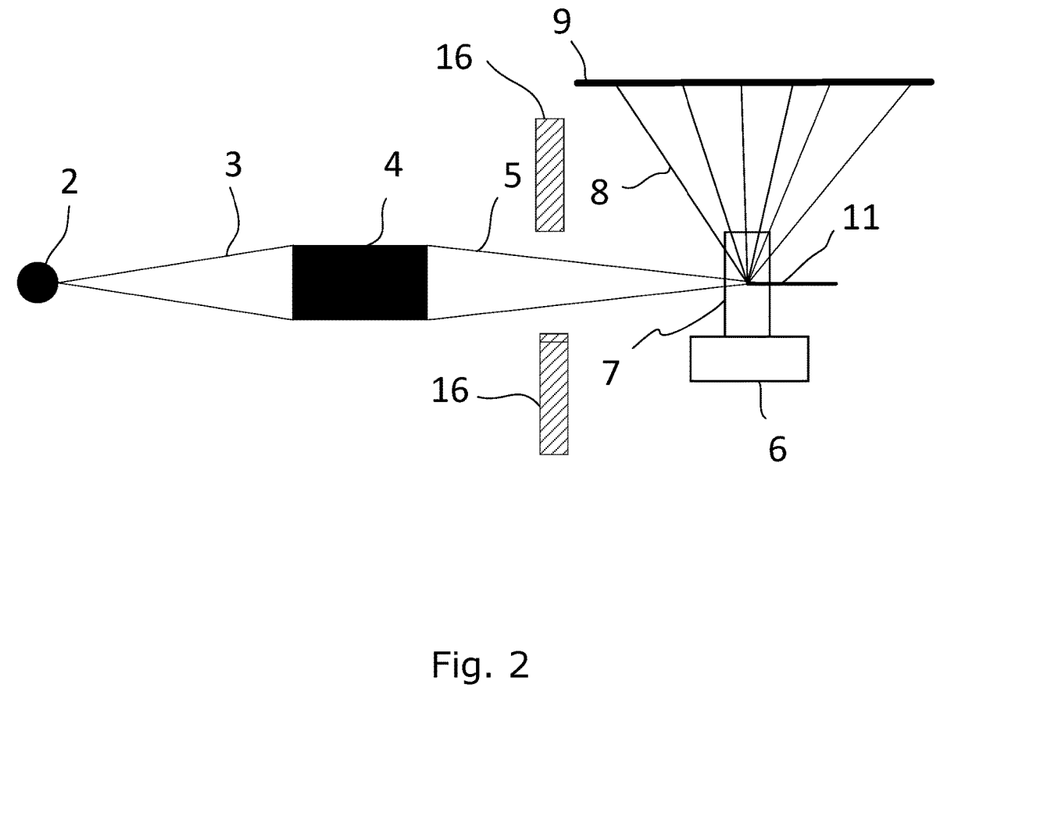
FIG. 2 illustrates an embodiment of the invention, the detector is placed 90 degrees relative to the incoming beam.

As seen in FIG. 2, the detector 9 can in an embodiment be placed with a 90 degree angle relative to focused beam 5. The detectors could therefore be placed in transmission geometry (0 degree) or reflection mode (90 degree) or back-projection mode (180 degrees) or any other angles. The system could include a shield 16 between the source 2 and the sample 7 for blocking the direct beam from the source 2.

Figure 3:
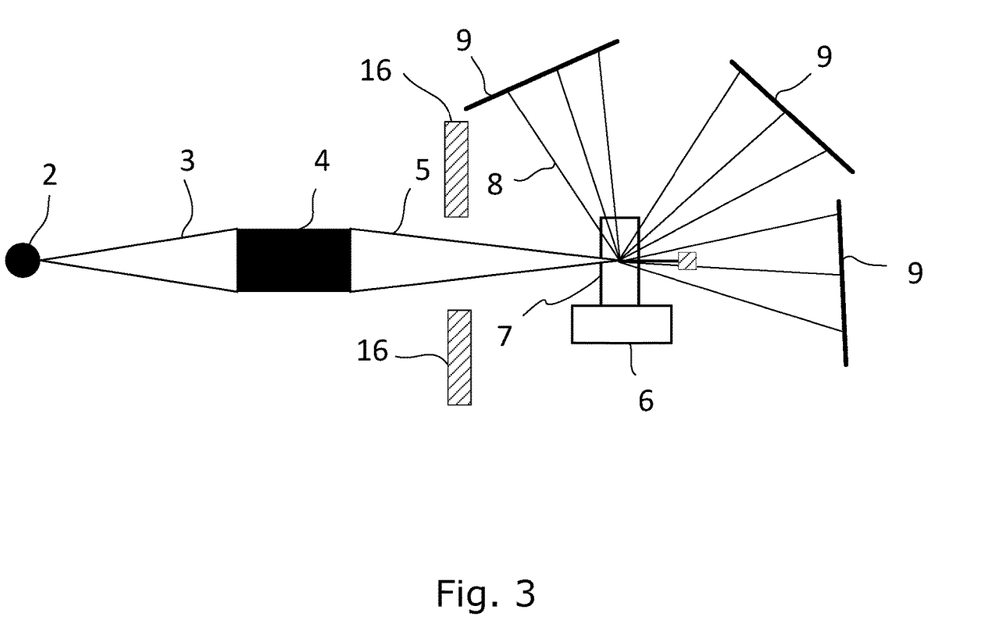
FIG. 3 illustrates an embodiment where three detectors are used to detect diffraction patterns.

As seen in FIG. 3, two or more detectors 9 can, in an embodiment, be arranged at different locations in the path of the diffracted X-rays 8, the detectors 9 having non-overlapping regions in a radial plane defined by the diffracted X-rays 8. Thereby a large detector area is created by having several smaller detectors 9 placed side by side.

The detector 9 can in an embodiment be placed 5-10 mm to a meter from the sample 7 and the focusing optic 4 can be placed 20-50 mm from the sample 7 (measured from the end of the focusing optic). The precise placement of the detector 9 and the optic 4 is dependent on the required spot diameter size, optic working distance, detector pixel size, and other external factors.

Figure 4:
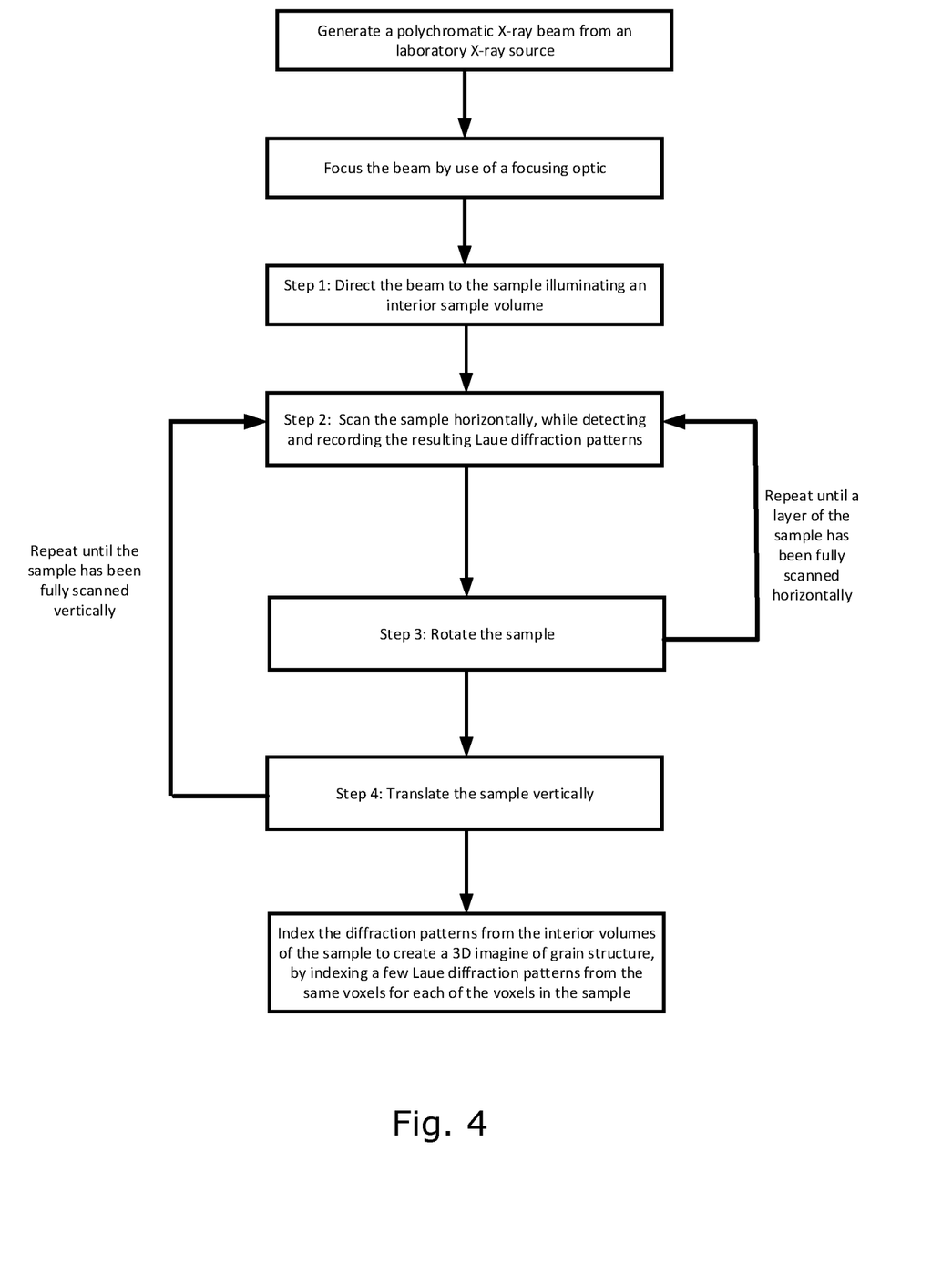
FIG. 4 is a flow-chart of an embodiment of the method according to the invention and FIG. 5 shows an embodiment of a voxel.

A flow diagram showing the method of generating the 3D image of the sample can be seen in FIG. 4. The method consists of in a first step to focus a laboratory X-ray source 2 to a spot size diameter less than 30 μm, directing the focused beam 5 into the sample 7 to be characterised thereby illuminating an interior sample volume 12 so as to create diffracted X-rays 8. In this example the beam 3,5 is horizontal, such that the first translation axis is horizontal and the second translation axis is vertically.

In a second step of the method, the sample 7 is scanned horizontally relative to the beam 3, 5. Each translation corresponds to a new measurement, where Laue diffraction pattern is recorded. When the sample 7 has been fully scanned horizontally, the sample 7 is rotated in a third step and horizontally scanned again according to step 2.

When the sample 7 has been fully rotated according to the specification of the rotations, the sample 7 is vertically translated in a fourth step to characterise a new layer of the sample 7 and steps 2 to 4 is repeated. This is done until all of the gauge volume of the sample 7 that is selected for characterisation have been scanned.

When the sample 7 has been fully scanned, the recordings of the diffraction patterns 13 can be used to index the individual voxels 15 of the gauge volume to reconstruct a 3D image of the sample. It is apparent that steps 2, 3 and 4 are interchangeable and can be done in an arbitrary order, as well as the rotation can be done in arbitrary steps, as well as mixed.

The thickness of the layers and translation size can be preselected based on the voxels 15 that is to be characterised in the gauge volume of the sample 7.

In an embodiment, the interior sample volumes 12 covers the volume of the sample 7 that can be illuminated by the focused beam 5 by rotating and translating the sample 7 at specific intervals. The scanned sample volume is also called the gauge volume, and all voxels in the gauge volume can be reconstructed.

If only a part of the sample is to be characterised, only that part of the sample is covered by the scanning range while the sample is rotated. So the gauge volume may be part of the sample or the whole sample.

In some embodiments there are overlapping regions between the interior sample volumes 12 during the scanning of the sample 7, such that the sample 7 is translated during scanning with a step size smaller than the focussed beam 5 spot diameter size. The exact placement and quantity of the interior sample volumes 12 depend on the specific requirements of the sample 7, such as the desired resolution, coverage, size of sample, etc.

The rotation intervals could in an embodiment be of the order of 1 to 90 degrees and the translation intervals could be the size of the beam spot size, such as between 1-30 µm, and the thickness of the layers could also be of the range of the beam spot size, such as between 1-30 µm, such as to ensure that the entire gauge volume is illuminated and all of the interior sample volumes 12 become the gauge volume.

When enough interior sample volumes 12 have been illuminated by the focused beam such that the diffraction patterns 13 from each voxel that is to be characterised have been recorded by a least two measurements, the recorded diffraction patterns 13 are indexed to reconstruct a 3D image of the grain structure of the sample 7. This is done by indexing patterns for individual voxels separately and reconstructing the 3D volume by interpolating the different indexed voxels.

The indexing could in an embodiment be pattern matching, dictionary indexing or carried out by using deep learning methods or other types of trained networks, such as AI, neural networks etc.

When the sample 7 is exposed to external stimuli it could change structure and characteristics over time. A 4D image of the sample could therefore be constructed by detecting the Laue diffraction patterns at different time intervals for the same interior sample volume. This enables one to monitor and examine crystalline material under external stimuli.

In summary, the invention may include one or more of the following items:

i. A laboratory-based 3D scanning X-ray Laue microdiffraction system (1) for characterisation of crystalline materials, comprising:
  a focusing optic (4),
  a sample (7) located at a distance from the focusing optic (4),
  a laboratory X-ray source (2) for generating a polychromatic X-ray beam (3),
  the focusing optic (4) being arranged in the path of the beam (3) between the X-ray source (2) and the sample (7) to create a focused beam (5) with a spot size diameter of less than 30 µm at an image point inside the sample (7), the focused beam (5) being diffracted from an interior sample volume (12), illuminated by the beam (5), within the sample (7) creating diffracted X-rays (8),
  a stage (6) for holding the sample (7), the stage being adapted to rotate and translate the sample (7) in relation to the focused beam (5),
  a detector (9) arranged to detect the Laue diffraction patterns (13) of the diffracted X-rays (8).

ii. A method for generating 3D orientation imaging of crystalline material comprising
  focusing a laboratory X-ray source (2), to a spot size diameter less than 30 µm inside a sample (7), to create a focused beam (5),
  defining a first translation axis perpendicular to the beam (5),
  defining a second translation axis perpendicular to the first translation axis and to the beam (5),
  defining one or more layers in a predetermined gauge volume of the sample (7) along the second translation axis,
  scanning each layer of the sample (7) by
    translating the sample (7) along the first translation axis at specific intervals recording the resulting diffraction patterns for each translation step,
    wherein each layer of the sample (7) is scanned at different rotations of the sample (7), so as to illuminate each voxel (15) in the layer in more than one rotation, such that Laue diffraction patterns from each voxel (15) are recorded in at least two recordings,
    wherein the layers are scanned by translating the sample (7) to the next layer along the second translation axis,
  indexing the recorded Laue diffraction patterns (13) to reconstruct a 3D image of the grain structure of the sample (7).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCES

1. Laboratory-based 3D scanning X-ray Laue microdiffraction system
2. Laboratory X-ray source
3. Polychromatic X-ray beam
4. Focusing optic
5. Focused beam
6. Stage
7. Sample
8. Diffracted X-rays
9. Detector
10. Beamstop
11. Transmitted beam
12. Interior sample volumes
13. Laue diffraction patterns
14. Another voxel
15. Voxel
16. Shield

The invention claimed is:
1. A laboratory-based 3D scanning X-ray Laue microdiffraction system for characterisation of crystalline materials, comprising:
  a focusing optic,
  a sample located at a distance from the focusing optic,
  a laboratory X-ray source configured to generate a polychromatic X-ray beam, the focusing optic being arranged in the path of the polychromatic X-ray beam between the X-ray source and the sample to create a focused beam with a spot size diameter of less than 30 µm at an image point inside the sample, the focused beam being diffracted from an interior sample volume, illuminated by the beam, within the sample creating diffracted X-rays, a stage for holding the sample, said stage being configured to rotate and translate the sample in relation to the focused beam at specific intervals and angles, and a detector configured to detect the Laue diffraction patterns of the diffracted X-rays.

2. The system according to claim 1, wherein a beamstop for blocking a transmitted beam is arranged after the sample and/or a shield for blocking the direction beam of the laboratory X-ray source that is not going through the focusing optic is placed between the sample and the laboratory X-ray source.

3. The system according to claim 1, wherein the laboratory X-ray source produces a polychromatic beam with X-ray energies ranges from 5-150 keV.

4. The system according to claim 1, wherein the focusing optic focuses the X-ray beam to a spot size diameter less than 20 µm.

5. The system according to claim 1, wherein the detector is a photon counting, flat-panel, scintillator based CCD or CMOS detector.

6. The system according to claim 1, wherein the focusing optic comprises a twin paraboloidal X-ray mirror optic, an elliptical shape, a polycapillary optic, or Kirkpatrick-Baez mirrors.

7. The system according to claim 1, wherein two or more detectors are arranged at different locations in the path of the diffracted X-rays, the two or more detectors having non overlapping regions in a radial plane defined by the diffracted X-rays.

8. The system according to claim 1, wherein the detector is placed 5-10 mm to 1 meter from the sample and the focusing optic is placed 20-50 mm (measured from the end of the optic) from the sample.

9. A method for generating 3D orientation imaging of crystalline material comprising:

focusing a polychromatic X-ray beam generated by a laboratory X-ray source to a spot size diameter less than 30 µm inside a sample to create a focused beam, defining a first translation axis perpendicular to the beam, defining a second translation axis perpendicular to the first translation axis and to the beam, defining one or more layers in a predetermined gauge volume of the sample along the second translation axis, scanning each layer of the sample by:
translating the sample along the first translation axis at specific intervals recording the resulting diffraction patterns for each translation step, wherein each layer of the sample is scanned at different rotations of the sample, so as to illuminate each voxel in the layer in more than one rotation, such that Laue diffraction patterns from each voxel are recorded in at least two recordings, wherein the layers are scanned by translating the sample to the next layer along the second translation axis, and indexing the recorded Laue diffraction patterns to reconstruct a 3D image of the grain structure of the sample.

10. The method according to claim 9, wherein the translation steps along the first translation axis are chosen based on the size of the beam and the sample, and the translation range covers part of the longest side or the whole of the longest side of the sample at the rotations.

11. The method according to claim 9, wherein the rotation intervals are of the order of 1 to 90 degrees and the translation intervals are of the range of 1-30 µm corresponding to the beam spot size.

12. The method according to claim 9, wherein the rotation intervals are the same for different rotations or change for each rotation.

13. The method according to claim 9, wherein the rotations add up to a quarter, half or full revolution of the sample or some other rotation ranges.

14. The method according to claim 9, wherein the Laue diffraction patterns are detected at different time intervals to create a 4-D image, wherein time is the fourth dimension, of the crystalline material.

15. The method according to claim 9, wherein the indexing comprises pattern matching, dictionary indexing, or deep learning.

* * * * *